United States Patent [19]

Kayane et al.

[11] Patent Number: 4,701,524
[45] Date of Patent: Oct. 20, 1987

[54] PYRIDONE MONOAZO COMPOUND HAVING VINYLSULFONE TYPE FIBER-REACTIVE GROUP

[75] Inventors: Yutaka Kayane, Ibaraki; Hirokazu Sawamoto, Minoo; Takashi Omura, Ashiya; Naoki Harada, Suita; Akira Takeshita, Toyonaka, all of Japan

[73] Assignee: Sumitomo Chemical Company, Limited, Osaka, Japan

[21] Appl. No.: 795,123

[22] Filed: Nov. 5, 1985

[30] Foreign Application Priority Data

Nov. 20, 1984 [JP] Japan .................. 59-245671

[51] Int. Cl.⁴ .............. C09B 62/45; C09B 62/53; D06P 1/384; D06P 3/66
[52] U.S. Cl. ..................... 534/642; 534/617; 534/635; 534/803; 534/581; 534/582; 534/598
[58] Field of Search .......... 534/635, 642, 617, 803

[56] References Cited

U.S. PATENT DOCUMENTS

| | | | |
|---|---|---|---|
| 3,261,824 | 7/1966 | Randall et al. | 534/803 X |
| 3,459,729 | 8/1969 | Crotte et al. | 534/803 X |
| 4,283,331 | 8/1981 | Seitz et al. | 534/635 X |

FOREIGN PATENT DOCUMENTS

| | | | |
|---|---|---|---|
| 0080352 | 1/1983 | European Pat. Off. | 534/635 |
| 0078009 | 4/1983 | European Pat. Off. | 534/635 |
| 56-159373 | 4/1981 | Japan | 534/635 |
| 57-161174 | 10/1982 | Japan | 534/635 |
| 59-51948 | 3/1984 | Japan | 534/635 |
| 59-155465 | 9/1984 | Japan | 534/635 |
| 59-168066 | 9/1984 | Japan | 534/635 |
| 59-174651 | 10/1984 | Japan | 534/635 |
| 1348641 | 3/1974 | United Kingdom | 534/635 |

Primary Examiner—Floyd D. Higel
Attorney, Agent, or Firm—Stevens, Davis, Miller & Mosher

[57] ABSTRACT

A monoazo compound, or a salt thereof, of the formula,

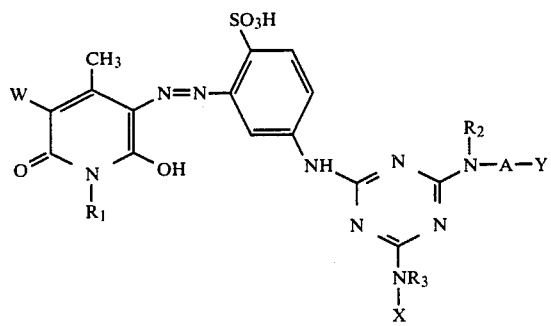

wherein W is a hydrogen atom or a carbamoyl group, $R_1$ is a lower alkyl group, $R_2$ and $R_3$ are independently a hydrogen atom or a lower alkyl group, A is an unsubstituted or substituted phenylene or naphthylene group, Y is $-SO_2CH=CH_2$ or $-SO_2CH_2CH_2Z$, in which Z is a group capable of being split by the action of an alkali, and X is an aromatic or aliphatic group substituted with one or two members selected from sulfonic acid group and carboxylic acid group, which is useful for dyeing fiber materials to give dyed products of a characteristic yellow color excellent in various fastness properties.

5 Claims, No Drawings

PYRIDONE MONOAZO COMPOUND HAVING VINYLSULFONE TYPE FIBER-REACTIVE GROUP

The present invention relates to a novel pyridone monoazo compound, a method for producing the same, and a method for dyeing fiber materials using the same.

More specifically, the invention relates to a fiber-reactive pyridone monoazo compound useful for dyeing fiber materials in a characteristic yellow color, a method for producing the same, and a method for dyeing fiber materials such as hydroxyl- or nitrogen-containing fiber materials using the same.

There are many kinds of fiber-reactive dyes useful for dyeing fiber materials, particularly cellulose fiber materials. Among them, reactive dyes having a β-sulfatoethylsulfonyl group and the like, which are so-called vinylsulfone type group, as the fiber-reactive group are particularly useful therefor. In this kind of reactive dyes, however, it is a problem awaiting solution to develope reactive dyes which are capable of giving dyed products of a characteristic color with high fastness properties, and which are well-balanced in various dye performances such as build-up property, solubility and insusceptibility to changes in dyeing temperature.

The present inventors have undertaken extensive studies to find a characteristic greenish yellow reactive dye having well-balanced dye performances, and found a pyridone monoazo compound.

The present invention provides a compound, or a salt thereof, represented by the following formula (I),

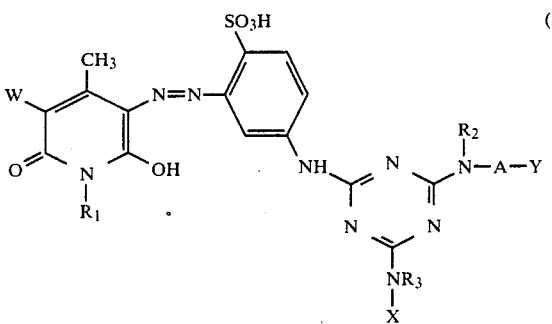

wherein W is a hydrogen atom or a carbamoyl group, $R_1$ is a lower alkyl group, $R_2$ and $R_3$ are independently a hydrogen atom or a lower alkyl group, A is an unsubstituted or substituted phenylene or naphthylene group, Y is $-SO_2CH=CH_2$ or $-SO_2CH_2CH_2Z$, in which Z is a group capable of being split by the action of an alkali, and X is an aromatic or aliphatic group substituted with one or two members selected from a group consisting of sulfonic acid group and carboxylic acid group, and a method for producing the compound of the formula (I), which comprises reacting cyanuric chloride and m-phenylenediaminesulfonic acid optionally together with at least one member selected from an arylamine represented by the following formula (II), $$\begin{array}{c} R_2 \\ | \\ HN-A-Y \end{array} \quad (II)$$

wherein $R_2$ and Y are as defined above, and an amine compound represented by the following formula (III), $$X-NHR_3 \quad (III)$$

wherein $R_3$ and X are as defined above, in an optional order to obtain a condensate, diazotizing the condensate, and coupling the diazotized condensate with a pyridone compound represented by the following formula (IV),

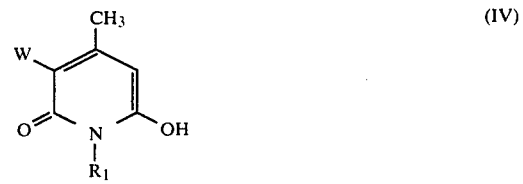

wherein $R_1$ and W are as defined above, and if necessary, reacting the resulting compound with the remaining amine(s) of the formula (II) or/and (III), and a method for dyeing fiber materials using the compound of the formula (I).

Among the compounds, or salts thereof, represented by the formula (I), preferred is a compound, or a salt thereof, represented by the following formula (I'),

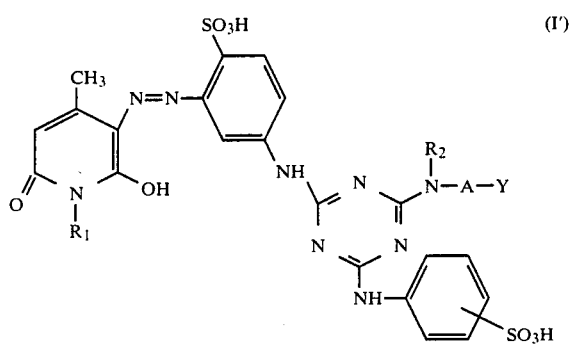

wherein $R_1$, $R_2$, A and Y are as defined above.

These compounds in accordance with the present invention may be in the form of a free acid or a salt of metals such as alkali metals and alkaline earth metals. Of these, preferred is a sodium, potassium or lithium salt. The group Z capable of being split by the action of an alkali includes, for example, a sulfuric acid ester, thiosulfuric acid ester, phosphoric acid ester or acetic acid ester group, or a halogen atom.

In the above formula (I), preferred A includes phenyl group unsubstituted or substituted with one or two members selected from chlorine and bromine atoms and methyl, ethyl, methoxy, ethoxy and sulfonic acid groups, and a naphthylene group unsubstituted or substituted with one sulfonic acid group. Examples thereof are as follows.

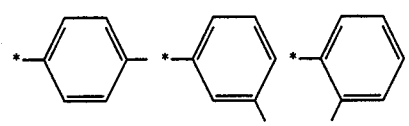

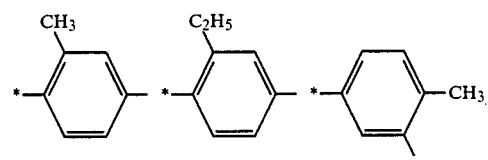

-continued

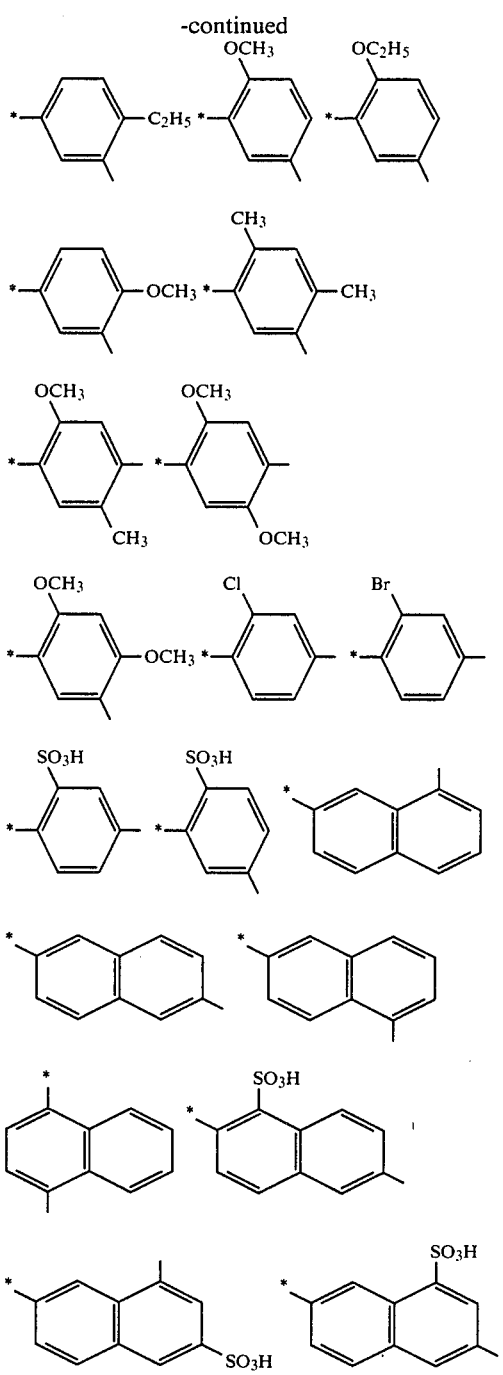

(In the above formulae, the asterisked linkage is bonded to the group,

)

With respect to the lower alkyl group represented by $R_1$, $R_2$, or $R_3$, preferred is one having 1 to 4 carbon atoms. Examples are methyl, ethyl, n-propyl, iso-butyl, sec-butyl and the like. Particularly preferred $R_1$ is a methyl, ethyl, n-propyl or n-butyl group, particularly preferred $R_2$ is a hydrogen atom or a methyl or ethyl group, and particularly preferred $R_3$ is a hydrogen atom.

The aromatic group represented by X includes, for example, phenyl and naphthyl which may be further substituted with methyl, methoxy halogen or acylamino, besides sulfonc acid group and/or caarboxylic acid group, and the aliphatic group includes a lower alkyl group such as methyl, ethyl and n-propyl. Examples of the amino group represented by the formula, $X-NR_3-$, are:

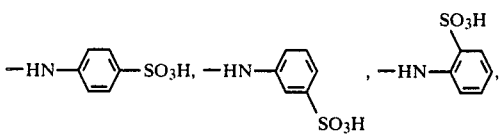

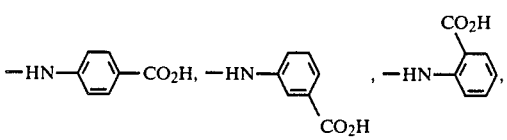

(which may be further substituted with methyl, methoxy, halogen or acylamino)

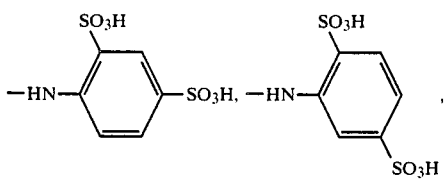

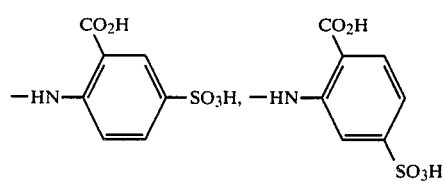

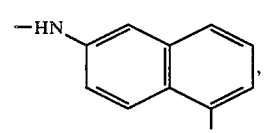

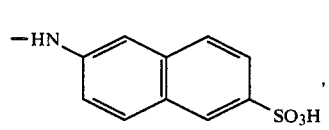

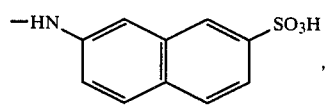

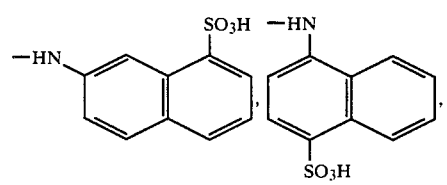

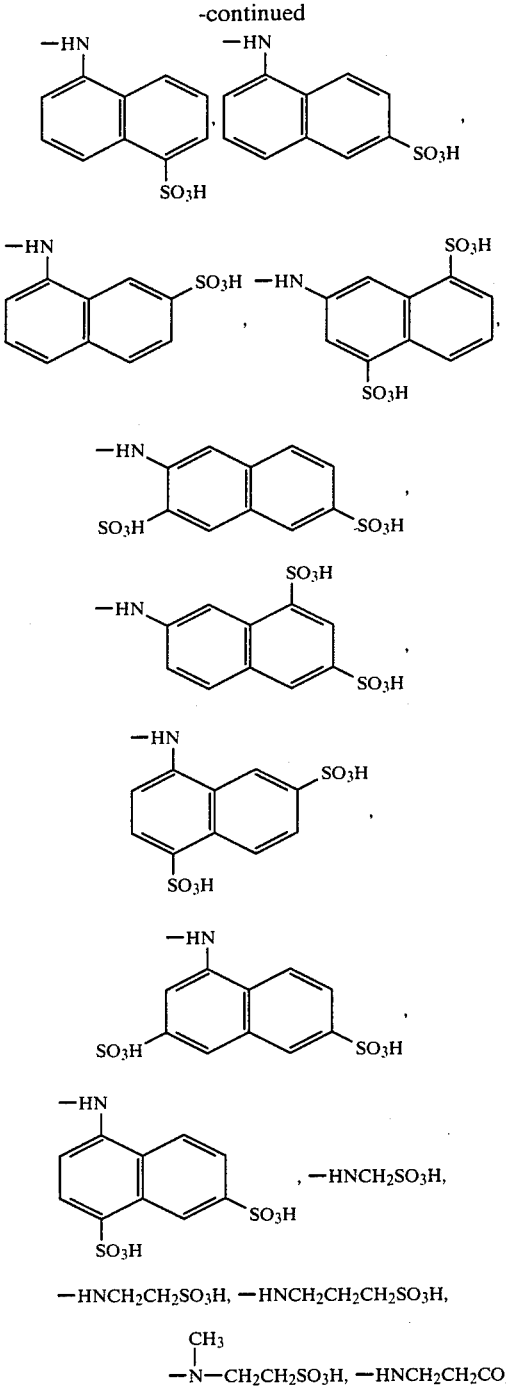

—HNCH$_2$CH$_2$SO$_3$H, —HNCH$_2$CH$_2$CH$_2$SO$_3$H, $$-\underset{\underset{CH_3}{|}}{N}-CH_2CH_2SO_3H, \quad -HNCH_2CH_2CO_2H.$$

Of these, preferred are 3-sulfophenylamino

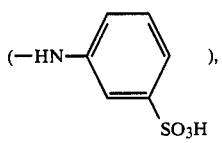

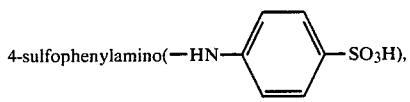

The compound of the formula (I) can be produced, for example in the following manner.

Any one of m-phenylenediaminesulfonic acid or the arylamine of the formula (II) is subjected to first condensation with cyanuric chloride, followed by second condensation using the remaining one, thereby obtaining a condensate represented by the following formula (V),

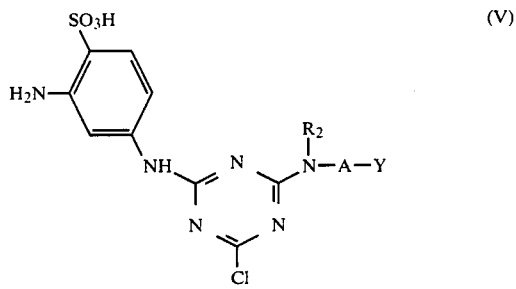

wherein R$_2$, A and Y are as defined above. The first and second condensations can be carried out in an aqueous medium at a temperature of 0° C. to 30° C., while controlling the pH within a range of 2 to 7, and at a temperature of 20° C. to 60° C., while controlling the pH within a range of 4 to 7, respectively.

The condensate of the formula (V) is diazotized in a conventional manner, followed by coupling with the pyridone compound of the formula (IV) at a temperature of 0° C. to 30° C., while controlling the pH within a range of 4 to 8, thereby obtaining an intermediate monoazo compound of the following formula (VI),

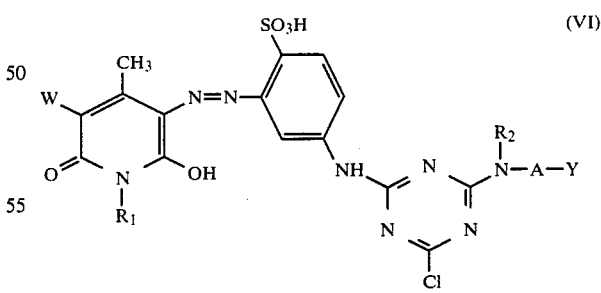

wherein W, R$_1$, R$_2$, A and Y are as defined above.

The intermediate monoazo compound of the formula (VI) is subjected to condensation with the amine compound of the formula (III) at a temperature of 60° C. to 100° C., while controlling the pH with a range of 3 to 6, thus obtaining the desired compound of the formula (I) or a salt thereof.

The compound (I) can be also produced in the following manner.

Any one of m-phenylenediaminesulfonic acid or the amine compound (III) is subnjected to first condensation with cyanuric chloride, followed by second condensation using the remaining one, to obtain a condensate. The resulting condensate is diazotized, then followed by coupling with the pyridone compound (IV), to obtain an intermediate monoazo compound of the following formula (VII),

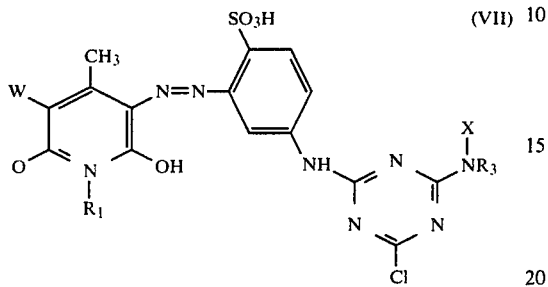
(VII)

wherein W, $R_1$, $R_3$ and X are as defined above. The intermediate monoazo compound (VII) is subjected to condensation with the arylamine (II), thereby obtaining the desired compound (I) or a salt thereof.

Moreover, the compound (I) can be also produced in the following manner.

m-Phenylenediaminesulfonic acid is subjected to reaction with cyanuric chloride in an aqueous medium at a temperature of 0° C. to 30° C., while controlling the pH within a range of 2 to 7, obtaining a dichlorotriazine compound represented by the following formula (VIII),

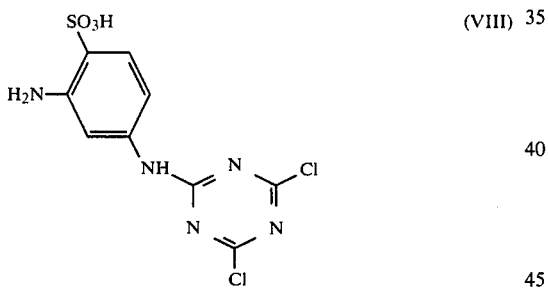
(VIII)

which compound is then diazotized in a conventional manner. The diazotized dichlorotriazine compound is subjected to coupling with the pyridone compound (IV), obtaining an intermediate monoazo compound represented by the following formula (IX),

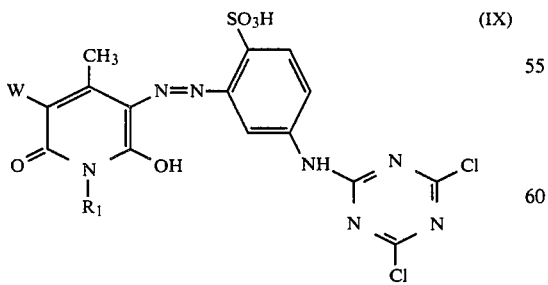
(IX)

wherein W and $R_1$ are as defined above. The intermediate compound (IX) is then subjected to first condensation with any one of the arylamine compound (II) or the amine compound (III), followed by second condensation with the remaining amine compound. The first condensation can be carried out at a temperature of 20° C. to 60° C., while controlling the pH within a range of 4 to 7, and the second condensation at a temperature of 60° C. to 100° C., while controlling the pH within a range of 3 to 6. Thus, the desired compound (I) or a salt thereof can be obtained.

Alternatively, any one of m-phenylenediamine sulfonic acid the arylamine compound (II) or the amine compound (III) is subjected to first condensation with cyanuric chloride, followed by second condensation, and then third condensation using any one of the remaining two, and then the last remaining one, in order, thus obtaining a condensate represented by the following formula (X),

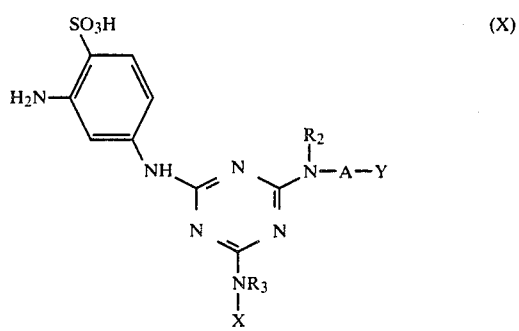
(X)

wherein $R_2$, $R_3$, A, X and Y are as defined above. The first condensation can be carried out at a temperature of 0° C. to 30° C., while controlling the pH within a range of 2 to 7, the second condensation at 20° C. to 60° C., while controlling the pH within a range of 4 to 7, and the third condensation at 60° C. to 100° C., while controlling the pH within a range of 3 to 6. The condensate is then diazotized in a conventional manner, and successively subjected to coupling with the pyridone compound (IV), thereby obtaining the desired compound (I) or a salt thereof.

The compound (I), or a salt thereof, of the present invention has a fiber-reactive group, and can be used for dyeing (including printing) hydroxyl group- or nitrogen-containing materials, which are preferably in a fibrous form. The fiber materials may be blended products.

The hydroxyl group-containing materials include natural or synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The nitrogen-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding or printing method.

The exhaustion dyeing method can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding method can be carried out by padding the fiber materials at ambient temperature or an elevated temperature, and after drying, steaming or dry-heating the materials to perform the dye-fixation.

The printing method can be carried out in a one-phase or two-phase manner. The one-phase printing method may be conducted by printing the fiber materials with a printing paste containing an acid binding agent such as sodium hydrogen carbonate and the like, followed by steaming at a temperature of 100° to 160° C. The two-phase printing method may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste emulsifier such as sodium alignate, starch ether and the like may be used, if desired, together with a conventional auxiliary agent such as urea and/or a dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium dihydrogen phosphate, disodium hydrogen phosphate, trisodium phosphate, sodium silicate, sodium trichloroacetate and the like.

The dyeing of natural or synthetic polyamide and polyurethane fiber material can be carried out by performing exhaustion in an acid or weak acid bath, while controlling the pH value, and then making the bath neutral, or in some cases alkaline to perform the fixation. The dyeing temeprature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonci acid, or an addition product between stearylamine and ethylene oxide, and the like.

The present compound can be characterized by excellent dye performances in the dyeing (including printing) of fiber materials, particularly cellulose fiber materials. For example, the compound can give a dyed product excellent in light fastness, perspiration-light fastness, wet fastness such as washing resistance, peroxide-washing resistance, chloride resistance, chlorine bleaching resistance, perspiration resistance and acid-hydrolysis resistance, and alkali fastness, abrasion fastness and iron fastness. The compound can also exhibit excellent build-up properties and favorable solubility. Moreover, the present compound can hardly be affected by changes in a dyeing temperature, so that a dyed product with a constant quality can be given with superior reproducibility.

The present invention is illustrated in more detail with reference to the following Examples, which are only illustrative, but not limitative. In Examples, parts and % are by weight.

EXAMPLE 1 m-Phenylenediaminesulfonic acid (5.6 parts) was dissolved in water (100 parts) at pH 6. To a dispersion prepared by dispersing cyanuric chloride (5.5 parts) in an ice water (100 parts), the solution was added dropwise at a temperature of between 0° C. and 5° C. over 1 hour, during which the pH was adjusted to between 3 and 4 using a 20% aqueous sodium carbonate solution. The mixture was stirred at that temperature and that pH, and then mixed with 1-aminobenzene-3-$\beta$-sulfatoethylsulfone (8.4 parts). The resulting mixture was heated to 30° C., while adjusting the pH to between 5 and 6 using a 20% aqueous sodium carbonate solution, and stirred for additional 3 hours. To this reaction mixture was added sodium nitrite (2.1 parts), and then 10% hydrochloric acid (33 parts) cooled to between 0° C. and 5° C. was added thereto over 1 hour. The mixture was stirred for additional 1 hour at a temperature of between 0° C. and 5° C. Thereafter, sulfamic acid was added to decompose an excess nitrous acid. To a disperson prepared by dispersing 1-ethyl-4-methyl-6-hydroxy-2-pyridone (4.6 parts) in water (100 parts), the above reaction mixture was added dropwise at a temperature of between 0° C. and 10° C. over 1 hour, during which the pH was adjusted to between 6 and 7 using a 20% aqueous sodium carbonate solution. The resulting mixture was stirred for additional 3 hours at that temperature and that pH. Then, metanilic acid (6.2 parts) was added thereto, and the mixture was heated to 80° C., while adjusting the pH to between 3 and 4 using a 20% aqueous sodium carbonate solution, and stirred for additional 6 hours at that temperaure. Thereafter, the reaction mixture was cooled to 30° C., and adjusted to a pH of between 5 and 6. Sodium chloride (60 parts) was added thereto to precipitate crystals, which were separated by filtration and dried at 60° C. Thus, a monoazo compound of the following formula,

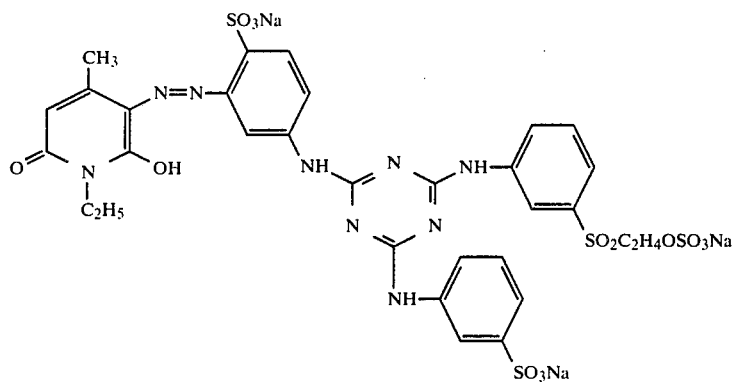

($\lambda_{max}$ 425 nm)

was obtained.

EXAMPLES 2 TO 21

Example 1 was repeated, provided that 1-amino-benzene-3-β-sulfatoethylsulfone, 1-ethyl-4-methyl-6-hydroxy-2-pyridone and matanilic acid, which were used in Example 1, were replaced by each arylamine compound (II), pyridone compound (IV) and amine compound (III), respectively, as shown in the following Table, whereby the corresponding monoazo compound characterized by the color on cotton as shown in Table was obtained.

TABLE

| Example No. | Arylamine (II) | Pyridone (IV) | Amine (III) | Color on cotton |
|---|---|---|---|---|
| 2 | H₂N—⟨⟩—OCH₃, SO₂C₂H₄OSO₃H | CH₃ pyridone with N-C₂H₅, =O, OH | H₂N—⟨⟩—SO₃H | Greenish yellow |
| 3 | H₂N—⟨⟩—SO₂C₂H₄OSO₃H | " | H₂N—⟨⟩—SO₃H (meta) | Greenish yellow |
| 4 | " | " | H₂N—⟨⟩—CO₂H (meta) | Greenish yellow |
| 5 | " | " | H₂N—⟨⟩—CO₂H (para) | Greenish yellow |
| 6 | H₂N—⟨⟩—SO₂C₂H₄OSO₃H (meta) | " | H₂N—⟨⟩—SO₃H | Greenish yellow |
| 7 | H₂N—⟨⟩—SO₂C₂H₄OSO₃H (meta) | " | H₂N—⟨⟩—CO₂H | Greenish yellow |

TABLE-continued

| Example No. | Arylamine (II) | Pyridone (IV) | Amine (III) | Color on cotton |
|---|---|---|---|---|
| 8 | " | " | H₂N—C₆H₄—CO₂H (meta) | Greenish yellow |
| 9 | " | 4-CH₃, 1-C₃H₇, 6-OH pyridone (2-one) | H₂N—C₆H₄—SO₃H (meta) | Greenish yellow |
| 10 | H₂N—C₆H₄—SO₂C₂H₄OSO₃H (para) | 4-CH₃, 1-C₄H₉, 6-OH pyridone (2-one) | " | Greenish yellow |
| 11 | H₂N—C₆H₄—SO₂CH=CH₂ (meta) | 4-CH₃, 1-C₂H₅, 6-OH pyridone (2-one) | H₂N—C₆H₄—SO₃H (meta) | Greenish yellow |
| 12 | H₂N—C₆H₄—SO₂C₂H₄OCOCH₃ (meta) | " | H₂N—C₆H₄—SO₃H (para) | Greenish yellow |
| 13 | H₂N—C₆H₃(CH₃)—SO₂C₂H₄Cl | 4-CH₃, 1-CH₃, 6-OH pyridone (2-one) | " | Greenish yellow |
| 14 | H₂N—C₆H₄—SO₂C₂H₄SSO₃H (para) | 4-CH₃, 1-C₂H₅, 6-OH pyridone (2-one) | H₂N—C₆H₄—SO₃H (meta) | Greenish yellow |
| 15 | H₂N—C₆H₄—SO₂C₂H₄OSO₃H (meta) | " | H₂N—naphthalene—(SO₃H)₂ | Greenish yellow |

TABLE-continued

| Example No. | Arylamine (II) | Pyridone (IV) | Amine (III) | Color on cotton |
|---|---|---|---|---|
| 16 | " | " | $H_2N$-naphthalene with $SO_3H$ (position 1) and $SO_3H$ (position 3) | Greenish yellow |
| 17 | $H_2N$-phenyl with $OCH_3$ and $SO_2CH=CH_2$ | 4-$CH_3$, N-$CH_3$, 6-OH pyridone | " | Greenish yellow |
| 18 | $H_2N$-phenyl with Cl and $SO_2C_2H_4OSO_3H$ | 4-$CH_3$, N-$C_2H_5$, 6-OH pyridone | $H_2N$-naphthalene with $SO_3H$ | Greenish yellow |
| 19 | $H_2N$-phenyl-$SO_2C_2H_4OPO_3H_2$ | " | $H_2N$-phenyl-$SO_3H$ | Greenish yellow |
| 20 | " | 4-$CH_3$, N-$CH_3$, 6-OH pyridone | $H_2N$-phenyl-$SO_3H$ | Greenish yellow |
| 21 | $H_2N$-naphthalene with $SO_3H$ and $SO_2C_2H_4OSO_3H$ | 4-$CH_3$, N-$C_2H_5$, 6-OH pyridone | " | Greenish yellow |

EXAMPLE 22

The monoazo compound (0.3 part) obtained in Example 1 was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature.

The dyed cotton was washed with water, soaped and washed with water to obtain a dyed product of a brilliant greenish yellow color excellent in fastness properties, particularly perspiration-light fastness and chlorine fastness. The monoazo compound used was found to have a good build-up property.

EXAMPLE 23

The monoazo compound (0.1 part) obtained in Example 6 was dissolved in water (150 parts), and sodium sulfate (10 parts) and cotton (10 parts) were added thereto. The bath was heated to 50° C., and then sodium carbonate (5 parts) was added to the bath. Dyeing was continued for 1 hour at that temperature.

The dyed cotton was washed with water, soaped and then washed with water to obtain a dyed product of a brilliant greenish yellow color excellent in fastness properties, particularly perspiration-light fastness and chlorine fastness. The monoazo compound used was found to have a good build-up property.

EXAMPLE 24

| Composition of color paste | parts |
|---|---|
| Monoazo compound obtained in Example 1 | 5 |
| Urea | 5 |
| Sodium alginate (5%), thickener | 50 |
| Hot water | 25 |
| Sodium hydrogencarbonate | 2 |

| Composition of color paste | |
|---|---|
| | parts |
| Balance (water) | 13 |

Mercerized cotton broad cloth was printed with the color paste having the composition described above, and then pre-dried, subjected to steaming at 100° C. for 5 minutes, rinsed with hot water, soaped, again rinsed with hot water, and then dried. Thus, there was obtained a printed product of a brilliant greenish yellow color excellent in fastness properties.

EXAMPLE 25

N-Ethylaminobenzene-4-β-sulfatoethylsulfone (9.3 parts) was dissolved in water (150 parts) at a pH of between 4 and 5, and this solution was cooled to a temperature of between 5° C. and 10° C., and then mixed with cyanuric chloride (5.5 parts). The mixture was stirred for 3 hours, during which the pH was adjusted to between 4 and 5 using a 20% aqueous sodium carbonate solution. m-Phenylenediaminesulfonic acid (5.6 parts) was added to the above reaction mixture, and the resulting mixture was heated to a temperature of between 20° C. and 25° C., while adjusting the pH to between 4 and 5, and then stirred for 3 hours at that temperature. Thereafter, the reaction mixture was adjusted to a pH of between 6 and 7, and then mixed with sodium nitrite. The resulting mixture was added dropwise over 1 hour to 10% hydrochloric acid (33 parts) cooled to a temperature of between 0° C. and 5° C. The mixture was stirred for additional 1 hour at a temperature of between 0° C. and 5° C. Sulfamic acid was added to the reaction mixture to decompose an excess nitrous acid. Successively, to a disperison prepared in advance by dispersing 1-propyl-4-methyl-6-hydroxy-2-pyridone (5 parts) in water (100 parts), the above reaction mixture was added dropwise at a temperature of between 0° C. and 10° C. over 1 hour, during which the pH was adjusted to between 6 and 7 using a 20% aqueous sodium carbonate solution. The mixture was stirred for additional 3 hours at that temperature and that pH, and thereafter mixed with sulfanilic acid (6.2 parts). The resulting mixture was heated to 80° C., while adjusting the pH to between 3 and 4, and stirred for 9 hours at that temperature. Thereafter, the reaction mixture was cooled to 30° C. and adjusted to a pH of between 5 and 6. Sodium chloride (70 parts) was added to the reaction mixture to precipitate crystals, which were then separated by filtration and dried at 60° C., then obtaining a monoazo compound of the following formula.

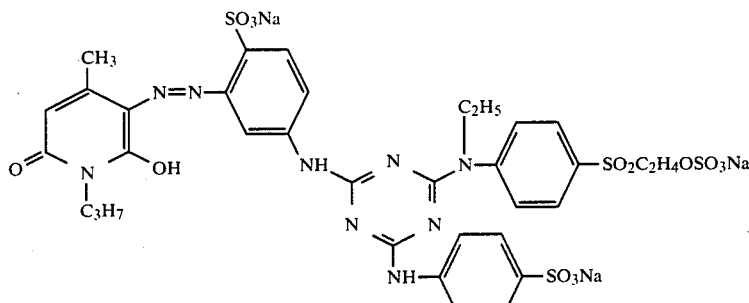

($\lambda_{max}$ 424 nm)

EXAMPLES 26 TO 34

Example 25 was repeated, provided that N-ethylbenzene-4-β-sulfatoethylsulfone, 1-propyl-4-methyl-6-hydroxy-2-pyridone and sulfanilic acid, which were used in Example 25, were replaced by each arylamine compound (II), pyridone compound (IV) and amine compound (III), respectively, as shown in the following Table, whereby each corresponding monoazo compound characterized by the color on cotton as shown in Table was obtained.

TABLE

| Example No. | Arylamine (II) | Pyridone (IV) | Amine (III) | Color on cotton |
|---|---|---|---|---|
| 26 | HN—⌬—SO$_2$C$_2$H$_4$OSO$_3$H | CH$_3$, O=⌬—OH, N—C$_2$H$_5$ | H$_2$N—⌬—SO$_3$H | Greenish yellow |
| 27 | CH$_3$, HN—⌬—SO$_2$C$_2$H$_4$OSO$_3$H | '' | H$_2$N—⌬—SO$_3$H | '' |

TABLE-continued

| Example No. | Arylamine (II) | Pyridone (IV) | Amine (III) | Color on cotton |
|---|---|---|---|---|
| 28 | C$_3$H$_7$-HN-C$_6$H$_4$-SO$_2$C$_2$H$_4$OSO$_3$H (meta) | 4-CH$_3$, 6-OH, 1-CH$_3$ pyridone | H$_2$N-C$_6$H$_4$-SO$_3$H (meta) | " |
| 29 | C$_2$H$_5$-HN-C$_6$H$_4$-SO$_2$CH=CH$_2$ (para) | " | H$_2$N-C$_6$H$_4$-CO$_2$H (meta) | " |
| 30 | C$_2$H$_5$-HN-C$_6$H$_4$-SO$_2$C$_2$H$_4$OSO$_3$H (meta) | 4-CH$_3$, 6-OH, 1-C$_3$H$_7$ pyridone | H$_2$N-C$_6$H$_4$-SO$_3$H (para) | " |
| 31 | " | 4-CH$_3$, 6-OH, 1-CH$_3$ pyridone | H$_2$N-C$_6$H$_4$-SO$_3$H (meta) | " |
| 32 | C$_2$H$_5$-HN-C$_6$H$_4$-SO$_2$C$_2$H$_4$OSO$_3$H (para) | 4-CH$_3$, 6-OH, 1-C$_2$H$_5$ pyridone | " | " |
| 33 | " | 4-CH$_3$, 6-OH, 1-CH$_3$ pyridone | H$_2$N-C$_6$H$_4$-SO$_3$H (para) | " |
| 34 | CH$_3$-HN-C$_6$H$_4$-SO$_2$C$_2$H$_4$OSO$_3$H (meta) | 4-CH$_3$, 6-OH, 1-C$_4$H$_9$ pyridone | H$_2$N-C$_6$H$_4$-SO$_3$H (para) | " |

EXAMPLE 35

The monoazo compound (0.3 part) obtained in Example 25 was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature.

The dyed cotton was washed with water, soaped, and again washed with water to obtain a dyed product of a brilliant greenish yellow color excellent in fastness properties, particularly perspiration-light fastness and chlorine fastness. The monoazo compound was found to exhibit a good level dyeing property.

EXAMPLE 36

The monoazo compound (0.1 part) obtained in Example 26 was dissolved in water (150 parts), and sodium sulfate (10 parts) and cotton (10 parts) were added thereto. The bath was heated to 50° C., and then sodium carbonate (5 parts) was added thereto. Dyeing was continued for 1 hour at that temperature.

The dyed cotton was washed with water, soaped, and again washed with water to obtain a dyed product of a brilliant greenish yellow color excellent in fastness properties, particularly perspiration-light fastness and chlorine fastness. The monoazo compound was found to exhibit a good level dyeing property.

EXAMPLE 37 m-Phenylenediaminesulfonic acid (5.6 parts) was dissolved in water (100 parts) at pH 6. To a dispersion prepared by dispersing cyanuric chloride (5.5 parts) in ice water (100 parts), the above solution was added dropwise at a temperature of between 0° C. and 5° C. over 1 hour, during which the pH was adjusted to between 3 and 4 using a 20% aqueus sodium carbonate solution. The mixture was stirred for additional 1 hour at that temperature and that pH, and then mixed with metanilic acid (5.2 parts). The resulting mixture was heated to 30° C., while adjusting the pH to between 6 and 7, and then stirred for additional 3 hours. Sodium nitrite (2.1 parts) was added thereto, and the mixture was added dropwise over 1 hour to 10% hydrochloric acid (33 parts) cooled to a temperature of between 0° C. and 5° C. The resulting mixture was stirred for additional 1 hour at a temperature of between 0° C. and 5° C. Sulfamic acid was added thereto to decompose an excess nitrous acid. To a dispersion prepared in advance by dispersing 1-ethyl-3-carbamoyl-4-methyl-6-hydroxy-2-pyridone (5.9 parts) in water (100 parts), the above reaction mixture was added dropwise at a temperature of between 0° C. and 10° C. over 1 hour, during which the pH was adjusted to between 6 and 7 using a 20% aqueous sodium carbonate solution. The resulting mixture was stirred for 3 hours at that temperature and that pH. Thereafter, 1-aminobenzene-3-$\beta$-sulfatoethylsulfone (8.4 parts) was added to the reaction mixture, and the resulting mixture was heated to 80° C., while adjusting the pH to between 3 and 4 using a 20% aqueous sodium carbonate solution, and then stirred for 6 hours at that temperature. After the reaction was over, the reaction mixture was cooled to 30° C. and adjusted to a pH between 5 and 6. Sodium chloride (60 parts) was added thereto to precipitate crystals, which were then separated by filtration and dried at 60° C., thereby obtaining a monoazo compound of the following formula.

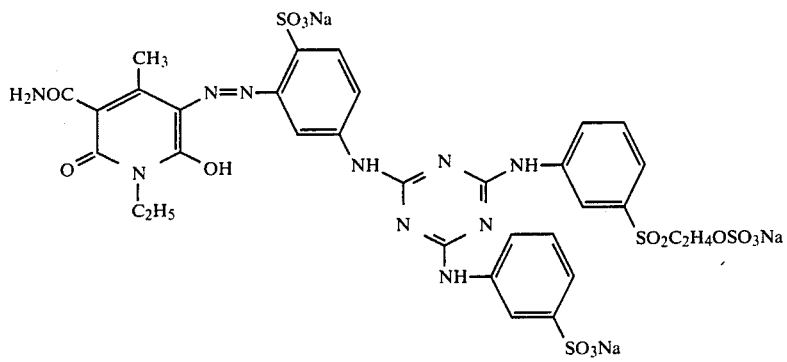

($\lambda_{max}$ 430 nm)

EXAMPLES 38 TO 49

Example 37 was repeated, provided that 1-aminobenzene-3-$\beta$-sulfatoethylsulfone, 1-ethyl-3-carbamoyl-4-methyl-6-hydroxy-2-pyridone and metanilic acid, which were used in Example 37, were replaced by each arylamine (II), pyridone compound (IV) and amine compound (III), respectively, as shown in the following Table, thereby obtaining the corresponding monoazo compound characterized by the color on cotton as shown in the following Table.

TABLE

| Example No. | Arylamine (II) | Pyridone (IV) | Amine (III) | Color on cotton |
|---|---|---|---|---|
| 38 | H₂N—⟨⟩—SO₂C₂H₄OSO₃H | H₂NOC, CH₃, pyridone with N-C₂H₅, OH, O | H₂N—⟨⟩—SO₃H | Greenish yellow |
| 39 | H₂N—⟨⟩—SO₂C₂H₄OSO₃H | H₂NOC, CH₃, pyridone with N-C₃H₇, OH, O | H₂N—⟨⟩—SO₃H | Greenish yellow |

TABLE-continued

| Example No. | Arylamine (II) | Pyridone (IV) | Amine (III) | Color on cotton |
|---|---|---|---|---|
| 40 | H₂N—⟨C₆H₃(OCH₃)(SO₂C₂H₄OSO₃H)⟩ | 3-H₂NOC, 4-CH₃, 6-OH, N-CH₃ pyridone | 2-SO₃H aniline | Greenish yellow |
| 41 | H₂N—⟨C₆H₄—SO₂CH=CH₂⟩ (meta) | 3-H₂NOC, 4-CH₃, 6-OH, N-C₂H₅ pyridone | H₂N—⟨C₆H₃(CH₃)(SO₃H)⟩ | Greenish yellow |
| 42 | 6-H₂N-2-(SO₂C₂H₄OSO₃H) naphthalene | " | H₂N—⟨C₆H₃(SO₃H)₂⟩ (2,5) | Greenish yellow |
| 43 | H₂N—⟨C₆H₄—SO₂C₂H₄OSO₃H⟩ (meta) | " | H₂N—⟨C₆H₃(SO₃H)(CH₃)⟩ | Greenish yellow |
| 44 | H₂N—⟨C₆H₄—SO₂C₂H₄SSO₃H⟩ (para) | " | H₂N—⟨C₆H₄—CO₂H⟩ (meta) | Greenish yellow |
| 45 | H₂N—⟨C₆H₄—SO₂C₂H₄OCOCH₃⟩ (meta) | 3-H₂NOC, 4-CH₃, 6-OH, N-C₄H₉ pyridone | H₂NCH₂CH₂SO₃H | Greenish yellow |
| 46 | H₂N—⟨C₆H₄—SO₂C₂H₄OSO₃H⟩ (meta) | 3-H₂NOC, 4-CH₃, 6-OH, N-C₂H₅ pyridone | 5-amino-2-naphthalenesulfonic acid | Greenish yellow |
| 47 | " | " | H₂N—⟨C₆H₃(CO₂H)(SO₃H)⟩ | Yellow |
| 48 | H₂N—⟨C₆H₄—SO₂C₂H₄OSO₃H⟩ (para) | " | " | " |

| Example No. | Arylamine (II) | Pyridone (IV) | Amine (III) | Color on cotton |
|---|---|---|---|---|
| 49 | 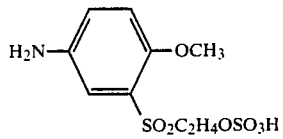 | " | " | " |

EXAMPLE 50

The monoazo compound (0.3 part) obtained in Example 37 was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature.

The dyed cotton was washed with water, soaped and washed with water to obtain a dyed product of a brilliant greenish yellow excellent in fastness properties, particularly perspiration-light fastness and chlorine fastness. The monoazo compound used was found to exhibit a good build-up property.

EXAMPLE 51

The monoazo compound (0.1 part) obtained in Example 38 was dissolved in water (150 parts), and sodium sulfate (10 parts) and cotton (10 parts) were added thereto. The bath was heated to 50° C., and then sodium carbonate (5 parts) was added to the bath. Dyeing was continued for 1 hour at that temperature.

The dyed cotton was washed with water, soaped and then washed with water to obtain a dyed product of a brilliant greenish yellow color excellent in fastness properties, particularly perspiration-light fastness and chlorine fastness. The monoazo compound used was found to exhibit a good build-up property.

EXAMPLE 52

| Composition of color paste | |
|---|---|
| | Parts |
| Monoazo compound obtained in Example 37 | 5 |
| Urea | 5 |
| Sodium alginate (5%), thickener | 50 |
| Hot water | 25 |
| Sodium hydrogencarbonate | 2 |
| Balance (water) | 13 |

Mercerized cotton broad cloth was printed with the color paste having the composition described above, and then pre-dried, subjected to steaming at 100° C. for 5 minutes, rinsed with hot water, soaped, again rinsed with hot water, and then dried. Thus, there was obtained printed product of a brilliant greenish yellow color excellent in fastness properties.

EXAMPLE 53

Condensation between m-phenylenediaminesulfonic acid and cyanuric chloride was carried out in the same manner as in Example 1, and the resulting reaction mixture was mixed with sodium nitrite (2.1 parts), and then added dropwise over 1 hour to 10% hydrochloric acid (33 parts) cooled to a temperature of between 0° C. and 5° C. The mixture was stirred for additional 1 hour at that temperature. Sulfamic acid was added thereto to decompose an excess nitrous acid. Thereafter, to a dispersion prepared in advance by dispersing 1-ethyl-4-methyl-6-hydroxy-2-pyridone (4.6 parts) in water (100 parts), the above reaction mixture was added dropwise at a temperature of between 0° C. and 10° C. over 1 hour, during which the pH was adjusted to between 6 and 7 using a 20% aqueous sodium carbonate solution. The resulting mixture was stirred at that temperature and that pH to complete the coupling reaction. Metanilic acid (6.2 parts) was added thereto, and the mixture was stirred, while adjusting the pH to between 5 and 6, to complete the condensation reaction. Thereafter, 1-aminobenzene-3-β-sulfatoethylsulfone (8.4 parts) was added to the condensation reaction mixture, and the resulting mixture was heated to 80° C., while adjusting the pH to between 3 and 4, and then stirred for 6 hours at that temperature. After, the reaction was over, sodium chloride was added to precipitate crystals. Thus, the same monoazo compound as in Example 1 was obtained.

EXAMPLE 54

Condensation reactions using m-phenylenediaminesulfonic acid, 1-aminobenzene-3-β-sulfatoethylsulfone and cyanuric chloride were carried out in the same manners as in Example 1. To the resulting condensation reaction mixture was added metanilic acid (6.2 parts), and the mixture was heated to 80° C., while adjusting the pH to between 3 and 4, and stirred at that temperature until the condensation reaction was completed. Thereafter, the reaction mixture was cooled to ambient temperature and mixed with sodium nitrite (2.1 parts). The resulting mixture was added dropwise to 10% hydrochloric acid (33 parts) at a temperature of between 0° C. and 5° C., and the mixture was stirred for 1 hour at that temperature. Sulfamic acid was added thereto to decompose an excess nitrous acid. To a dispersion prepared in advance by dispersing 1-ethyl-4-methyl-6-hydroxy-2-pyridone (4.6 parts) in water (100 parts), the above reaction mixture was added at a temperature of between 0° C. and 10° C., while adjusting the pH to between 6 and 7, and then stirred at that temperature and that pH until the coupling reaction was over. Sodium chloride was added to the reaction mixture to precipitate crystals. Thus, the same monoazo compound as in Example 1 was obtained.

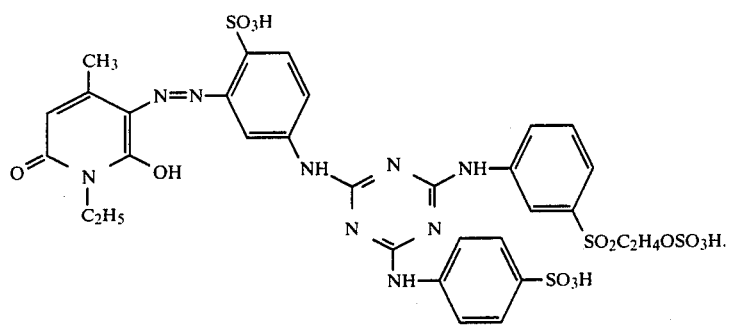

What is claimed is:

1. A monoazo compound, or a salt thereof, represented by the formula,

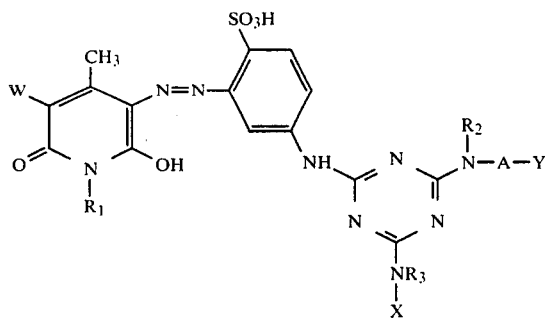
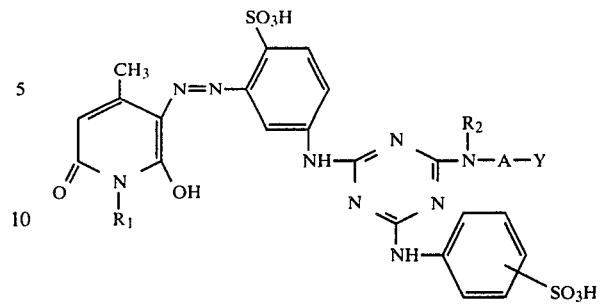

wherein W is hydrogen or carbamoyl, $R_1$ is lower alkyl, $R_2$ and $R_3$ are independently hydrogen or lower alkyl, A is phenylene unsubstituted or substituted with one or two members selected from the group consisting of chlorine, bromine, methyl, ethyl, methoxy, ethoxy and sulfo, or naphthylene unsubstituted or substituted with one sulfo, Y is $-SO_2CH_2CH_2Z$, in which Z is a group capable of being split by the actio of an alkali, and X is sulfo- or carboxy-substituted phenyl or naphthyl unsubstituted or substituted with methyl, methoxy, or halogen, or sulfo-or carboxy-substituted lower alkyl.

wherein $R_1$ is lower alkyl, $R_2$ is hydrogen or lower alkyl, A is phenylene unsubstituted or substituted with one or two members selected from the group consisting of chlorine, bromine, methyl, ethyl, methoxy, ethoxy and sulfo, or naphthylene unsubstituted or substituted with one sulfo, and Y is $-SO_2CH=CH_2$ or $-SO_2CH_2CH_2Z$, in which Z is a group capable of being split by the action of an alkali.

3. A monoazo compound, or a salt thereof, represented by the formula,

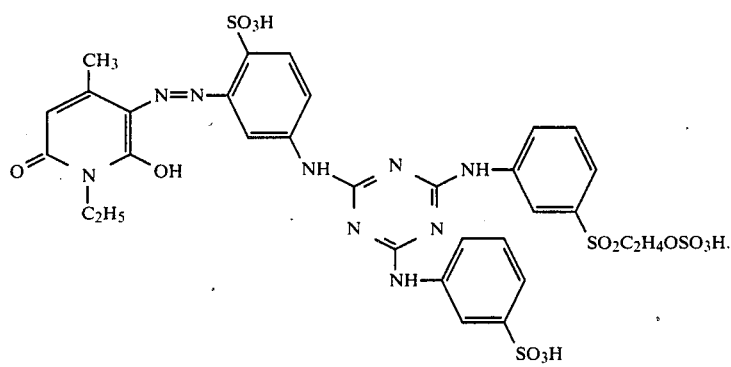

4. A monoazo compound, or a salt thereof, represented by the formula,

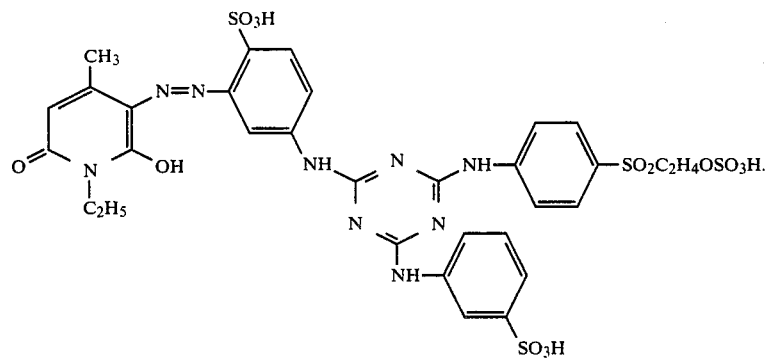

2. A monoazo compound, or a salt thereof, represented by the formula

5. A monoazo compound, or a salt thereof, represented by the formula,